(12) United States Patent
Otsuka

(10) Patent No.: US 6,324,344 B1
(45) Date of Patent: Nov. 27, 2001

(54) LIGHT MEASURING DEVICE AND CAMERA

(75) Inventor: Genta Otsuka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/524,252

(22) Filed: Mar. 13, 2000

(30) Foreign Application Priority Data

Mar. 19, 1999 (JP) .................................................. 11-075782

(51) Int. Cl.$^7$ ....................................................... G03B 7/08
(52) U.S. Cl. .......................... 396/228; 356/222; 396/234
(58) Field of Search .................................. 396/233, 234, 396/228–230; 356/222, 223; 348/229, 246, 247, 241, 250, 251

(56) References Cited

U.S. PATENT DOCUMENTS

Re. 32,376 * 3/1987 Fukuhara et al. .................... 396/234
5,602,615 * 2/1997 Muramatsu et al. ................. 396/228

\* cited by examiner

*Primary Examiner*—W. B. Perkey
(74) *Attorney, Agent, or Firm*—Robin, Blecker & Daley

(57) ABSTRACT

A light measuring device includes an integration-type light measuring sensor having a plurality of pixels and arranged to logarithmically compress a signal of light received by each pixel and to output the signal as a light measurement value for each pixel, a memory arranged to store an average of gain correction values for all pixels of the light measuring sensor, a deviation from the average of gain correction values obtained for each pixel of the light measuring sensor, a level correction value for each pixel of the light measuring sensor obtained for a reference integration period, and an average of level shift amounts of all pixels of the light measuring sensor caused by a change of integration period, and a computing circuit arranged to compute, from the level correction value for each pixel and the average of level shift amounts of all pixels stored in the memory, a level correction value for each pixel of the light measuring sensor for an integration period other than the reference integration period.

14 Claims, 13 Drawing Sheets

SENSOR PIXELS

| 00 | 01 |     | 09 |
|----|----|-----|----|
|    |    |     |    |
| 90 | 91 |     | 99 |

ROM

| 0  | $\Delta$ GAIN (00) | $\Delta$ GAIN (01) | 1 byte |
|----|--------------------|--------------------|--------|
| 1  | $\Delta$ GAIN (02) | $\Delta$ GAIN (03) | 1 byte |
| 2  | $\Delta$ GAIN (04) | $\Delta$ GAIN (05) | 1 byte |
|    |                    |                    |        |
| 49 | $\Delta$ GAIN (98) | $\Delta$ GAIN (99) | 1 byte |
| 50 | GAIN _ AVE         |                    | 1 byte |

FIG. 1

| | | | | | | |
|---|---|---|---|---|---|---|
| 0 | ΔGAIN(00) | | | | | 1 byte |
| 1 | ΔGAIN(01) | | | | | 1 byte |
| 2 | ΔGAIN(02) | | | | | 1 byte |
| | ΔGAIN(03) | | | | | |
| | ΔGAIN(04) | | | | | |
| | ΔGAIN(05) | | | | | |
| ... | ... | | | | | |
| 49 | ΔGAIN(98) ΔGAIN(99) | | | | | 1 byte |
| 50 | GAIN_AVE | | | | | 1 byte |

ROM

SENSOR PIXELS

| 00 | 01 | ... | 09 |
|---|---|---|---|
| | | | |
| 90 | 91 | ... | 99 |

FIG. 5

《 FORMULAS FOR CALCULATING GAIN CORRECTION VALUE 》

$$Exp = \frac{GAIN}{T} \times (AD - AEBase) + LEVEL \quad \cdots\cdots (1)$$

$$Exp(a) = \frac{GAIN}{T} \times (AD(a) - AEBase) + LEVEL \quad \cdots\cdots (2)$$

$$Exp(b) = \frac{GAIN}{T} \times (AD(b) - AEBase) + LEVEL \quad \cdots\cdots (3)$$

$$GAIN = \frac{Exp(b) - Exp(a)}{AD(b) - AD(a)} \times T \quad \cdots\cdots (4)$$

FIG. 6

《 FORMULAS FOR CALCULATING LEVEL CORRECTION VALUE 》

$$Exp = \frac{GAIN}{T} \times (AD - AEBase) + LEVEL \quad \cdots\cdots (1)$$

$$LEVEL = Exp(b) - \frac{GAIN}{T} \times (AD(b) - AEBase) \quad \cdots\cdots (5)$$

FIG. 7

《 BASIC FORMULA FOR LEVEL SHIFT AMOUNT 》

$$\Delta LVL(bs, m) = \Delta T\_Ev(bs, m) \times \Delta AE \qquad \cdots (6)$$

《 AMOUNT OF CHANGE OF LIGHT QUANTITY
CAUSED BY CHANGE OF INTEGRATION PERIOD 》

$$\Delta T\_Ev(bs, m) = \log_2\left(\frac{m}{bs}\right) \qquad \cdots (7)$$

《 OUTPUT CHANGE CHARACTERISTIC ( CHANGE OF OUTPUT PER 1Ev ) 》

$$\Delta AE = \frac{AD(b) - AD(a)}{b - a} \qquad \cdots (8)$$

《 LEVEL SHIFT AMOUNT 》

$$\Delta LVL(bs, m) = \log_2\left(\frac{m}{bs}\right) \times \frac{AD(b) - AD(a)}{b - a} \qquad \cdots (9)$$

$(\because \text{FORMULAS}(6),(7) \text{ AND }(8))$

《 LEVEL SHIFT AMOUNT USING GAIN 》

$$\Delta AE = \frac{(Exp(b) - Exp(a))}{(b-a) \cdot GAIN} \times T \qquad \cdots (10)$$

$(\because \text{FORMULAS}(4) \text{ AND }(8))$ $$\Delta LVL(bs, m) = \log_2\left(\frac{m}{bs}\right) \times \frac{(Exp(b) - Exp(a))}{(b-a) \cdot GAIN} \times T \qquad \cdots (11)$$

$(\because \text{FORMULAS}(6),(7) \text{ AND }(10))$

F I G. 9

| | $T_s = bs\ (ms)$ | $T_s = m\ (ms)$ |
|---|---|---|
| GAIN DEVIATION AMOUNT | $\triangle GAIN\ (i)$ | ⇩ |
| GAIN AVERAGE VALUE | $GAIN\_AVE$ | ⇩ |
| GAIN CALCULATING FORMULA | $\triangle GAIN\ (i) + GAIN\_AVE$ | ⇩ |
| LEVEL | $LVL\_bs\ (i)$ | |
| LEVEL SHIFT AMOUNT | | $\triangle LVL\ (bs, m)\ ave$ |
| LEVEL CALCULATING FORMULA | $LVL\_bs\ (i)$ | $LVL\_bs\ (i) + \triangle LVL\ (bs, m)\ ave$ |

※ $i = 0 \sim 99$

FIG. 12

| | Ts = bs (ms) | Ts = m (ms) |
|---|---|---|
| GAIN DEVIATION AMOUNT | $\Delta$GAIN (i) | $\Downarrow$ |
| GAIN AVERAGE VALUE | GAIN_AVE | $\Downarrow$ |
| GAIN CALCULATING FORMULA | $\Delta$GAIN (i) + GAIN_AVE | $\Downarrow$ |
| LEVEL | LVL_bs (i) | — |
| AMOUNT OF CHANGE OF LIGHT QUANTITY CAUSED BY CHANGE OF INTEGRATION PERIOD | — | $\Delta T\_Ev(bs, m)$ |
| LEVEL CALCULATING FORMULA | LVL_bs (i) | $LVL\_bs(i) + \Delta T\_Ev(bs, m)$ $\times \dfrac{Exp(b) - Exp(a)}{(b-a) \cdot GAIN(i)} \times T$ |

※ i = 0 ~ 99

LIGHT MEASURING DEVICE AND CAMERA

BACKGROUND OF THE INVENTION

1. Field of the Invention

The present invention relates to an improvement on a light measuring device having an integration-type light measuring sensor.

2. Description of Related Art

Some of known exposure computing devices use multiple-divided integration-type light measuring sensors arranged to logarithmically compress an electrical signal from a light receiving part and to output the compressed signal as a light measurement output measured by each pixel. To have one and the same specific output value from all the pixels of the light measuring sensor for a field having uniform distribution of luminance which varies, the exposure computing device of this kind is arranged to make level correction and gain correction on each pixel of the light measuring sensor and to compute an exposure value on the basis of these correction values and the output values of the light measuring sensor. A memory which is provided for storing correction values is arranged to store the level correction value and gain correction value for each of pixels. Assuming that a storage capacity of 1 byte is necessary per pixel for storing each of the level correction value and gain correction value, in the case of a light measuring sensor which is divided into six parts, i.e., pixels, for example, a storage capacity necessary for correction of all pixels is "2 bytes×6=12 bytes".

To broaden the dynamic range of the integration-type light measuring sensor, the integration period of the light measuring sensor is sometimes varied according to changes taking place in luminance of a field. Therefore, in order to obtain a highly reliable exposure value, it has been necessary to correct the sensor outputs for a plurality of integration periods. Then, in the case of the above-stated light measuring sensor divided into six parts, if this sensor is arranged to be capable of coping with five different integration periods, the memory which stores sensor-output correction values must be arranged to have a storage capacity of "12×5=60 bytes".

As described above, the conventional exposure computing device is arranged to use a multiple-divided integration-type light measuring sensor, to be provided with correction values for making the output of the light measuring sensor into specific values suited for various luminance values, and to carry out an exposure computing operation by using the correction values as applicable. In a case where the number of dividing the light measuring sensor increases and the different integration periods are many in number, an enormous storage capacity becomes necessary for adequately correcting the output of the light measuring sensor. For example, with a memory capacity required for storing a gain correction value per pixel assumed to be 1 byte, if a light measuring sensor divided into 100 pixels is arranged to be capable of coping with three different integration periods, as shown in FIG. 13, the memory must be arranged to have a storage capacity of "100×1=100 bytes" for gain correction. Further, with a memory capacity required for storing a level correction value per pixel assumed to be 1 byte in this case, as shown in FIG. 14, the memory must have a storage capacity of "100×3=300 bytes" for level correction. Then, a total storage capacity of the memory required for all correction values becomes 400 bytes.

The conventional arrangement also requires many processes for computing and storing the sensor correction values in the memory within an exposure computing part. A very long period of time thus becomes necessary for adjusting the outputs of the light measuring sensor.

BRIEF SUMMARY OF THE INVENTION

It is one object of the invention to provide a light measuring device for a camera or the like arranged to be capable of solving the problems of the conventional arrangement described in the foregoing.

To attain the above object, in accordance with one aspect of the invention, there is provided a light measuring device, which comprises an integration-type light measuring sensor having a plurality of pixels and arranged to logarithmically compress a signal of light received by each pixel and to output the signal as a light measurement value for each pixel, a memory arranged to store an average of gain correction values for all pixels of the light measuring sensor, a deviation-from the average of gain correction values obtained for each pixel of the light measuring sensor, a level correction value for each pixel of the light measuring sensor obtained for a reference integration period, and an average of level shift amounts of all pixels of the light measuring sensor caused by a change of integration period, and a computing circuit arranged to compute, from the level correction value for each pixel and the average of level shift amounts of all pixels stored in the memory, a level correction value for each pixel of the light measuring sensor for an integration period other than the reference integration period, so that, as compared with a case where a memory is arranged to store a level correction value for each pixel of the light measuring sensor with respect to every one of different integration periods, the above arrangement effectively permits reduction in storage capacity of the memory.

The above and other aspects and features of the invention will become apparent from the following detailed description of preferred embodiments thereof taken in connection with the accompanying drawings.

BRIEF DESCRIPTION OF THE SEVERAL VIEWS OF THE DRAWING

FIG. 1 shows how gain correction values are stored in a memory of an exposure computing device according to a first embodiment of the invention.

FIG. 5 shows computation formulas to be used for obtaining a gain correction value in the first embodiment.

FIG. 6 shows computation formulas for obtaining a level correction value in the first embodiment.

FIG. 7 shows computation formulas for obtaining a level shift amount in the first embodiment and in a second embodiment of the invention.

FIG. 9 shows a stored state of correction values in the memory and correction-value computing formulas in the first embodiment of the invention.

FIG. 12 shows a stored state of correction values in the memory and correction-value computing formulas in the second embodiment of the invention.

DETAILED DESCRIPTION OF THE INVENTION

Hereinafter, preferred embodiments of the invention will be described in detail with reference to the drawings.

Before describing a first embodiment of the invention, how gain correction values and level correction values for a light measuring sensor are obtained and stored in a memory is briefly described.

It is a characteristic feature of the logarithmic-compression-type light measuring sensor that the output change characteristic of one pixel in response to changes of light quantity after logarithmic compression does not much differ from that of another among pixels formed on the same lot and by the one and the same circuit. Gain correction, therefore, can be carried out by computing the average of gain correction values for all pixels and by assigning a difference (deviation amount) of the gain correction value of each pixel from the average value to the pixel as a correction value. Gain correction data obtained in this manner can be stored for each pixel with a relatively small storage capacity. The large storage capacity which has been required for gain correction of each pixel according to the conventional arrangement can be lessened by virtue of this arrangement.

Figure 13:
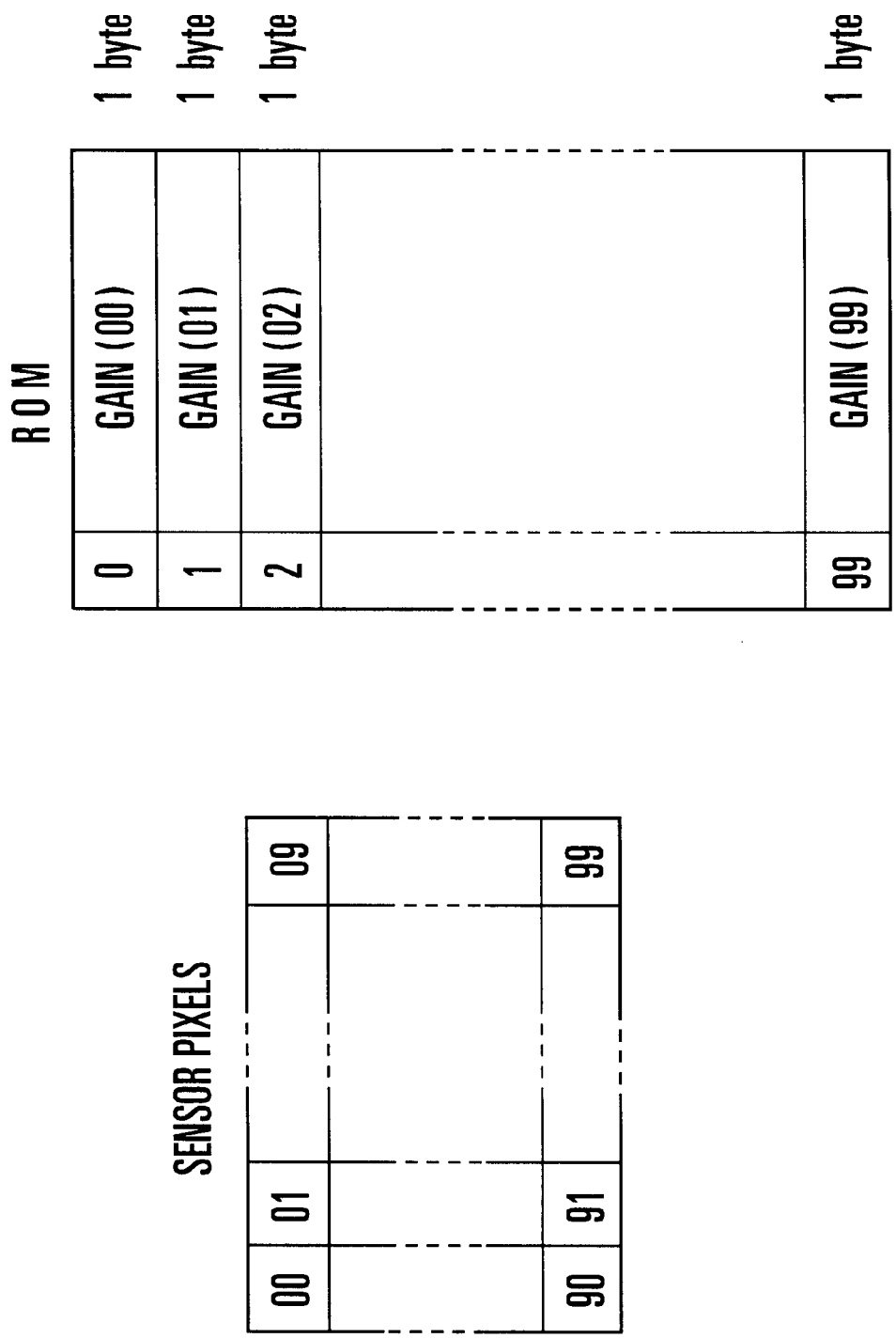
FIG. 13 shows how gain correction values are stored in a memory by the conventional device.

For example, a light measuring sensor composed of 100 pixels as shown in FIG. 1 is assumed to require a storage capacity of 8 bits per pixel for gain correction. Then, with an amount of deviation ΔGAIN(i) from the average gain correction value GAIN_AVE of all pixels arranged to be stored for each pixel, the storage capacity required for the correction value ΔGAIN(i) for each pixel is only about 4 bits. While the conventional arrangement has required a storage capacity of 100 bytes for gain correction as shown in FIG. 13, the above arrangement requires a storage capacity of only 51 bytes for gain correction, because the correction value for each pixel requires 4 bits and the average gain correction value of all pixels requires 8 bits.

Further, as regards the output characteristic (level correction value) of each pixel for a plane having uniform luminance differs from that of another due to uneven offset among pixels of the light measuring sensor, output unevenness among the pixels due to some distortion taking place in converging light of field on the light measuring sensor through an optical system, etc. In order to correct the output levels of the pixels of the light measuring sensor in such a way as to equalize them for one and the same field having uniform luminance, therefore, it is inevitably necessary to arrange a memory to have a predetermined storage capacity for each of the pixels. Then, in a case where the memory must be arranged to be capable of coping with a plurality of different integration periods, considering the characteristic of the light measuring sensor arranged to logarithmically compress an electrical signal from a light receiving part before outputting the signal, it is possible to compute an output difference from an output obtained by a reference integration period on the basis of a change of integrated light quantity caused by a change of integration period from the reference integration period and an output change characteristic of each pixel for changes of luminance (output change per Ev). Therefore, where the exposure computing device must be arranged to be capable of coping with a plurality of changes of integration period (hereinafter referred to as different integration periods), the exposure computing device (light measuring device) is arranged to store a level correction value applicable to one reference integration period beforehand and to obtain a level correction value for another integration period by carrying out a computing operation.

Figure 2:
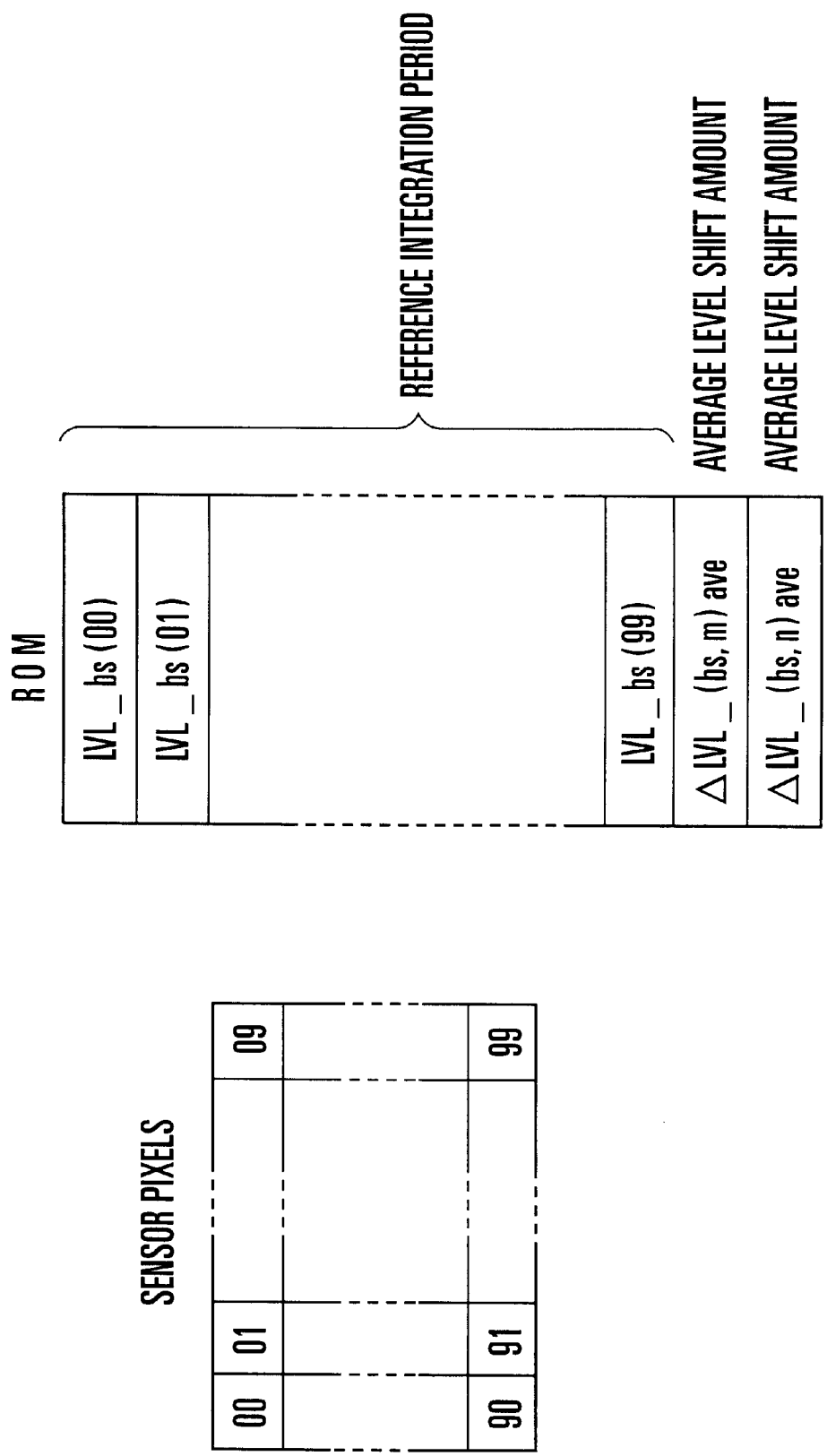
FIG. 2 shows how level correction values are stored in the memory of the exposure computing device according to the first embodiment of the invention.
Figure 14:
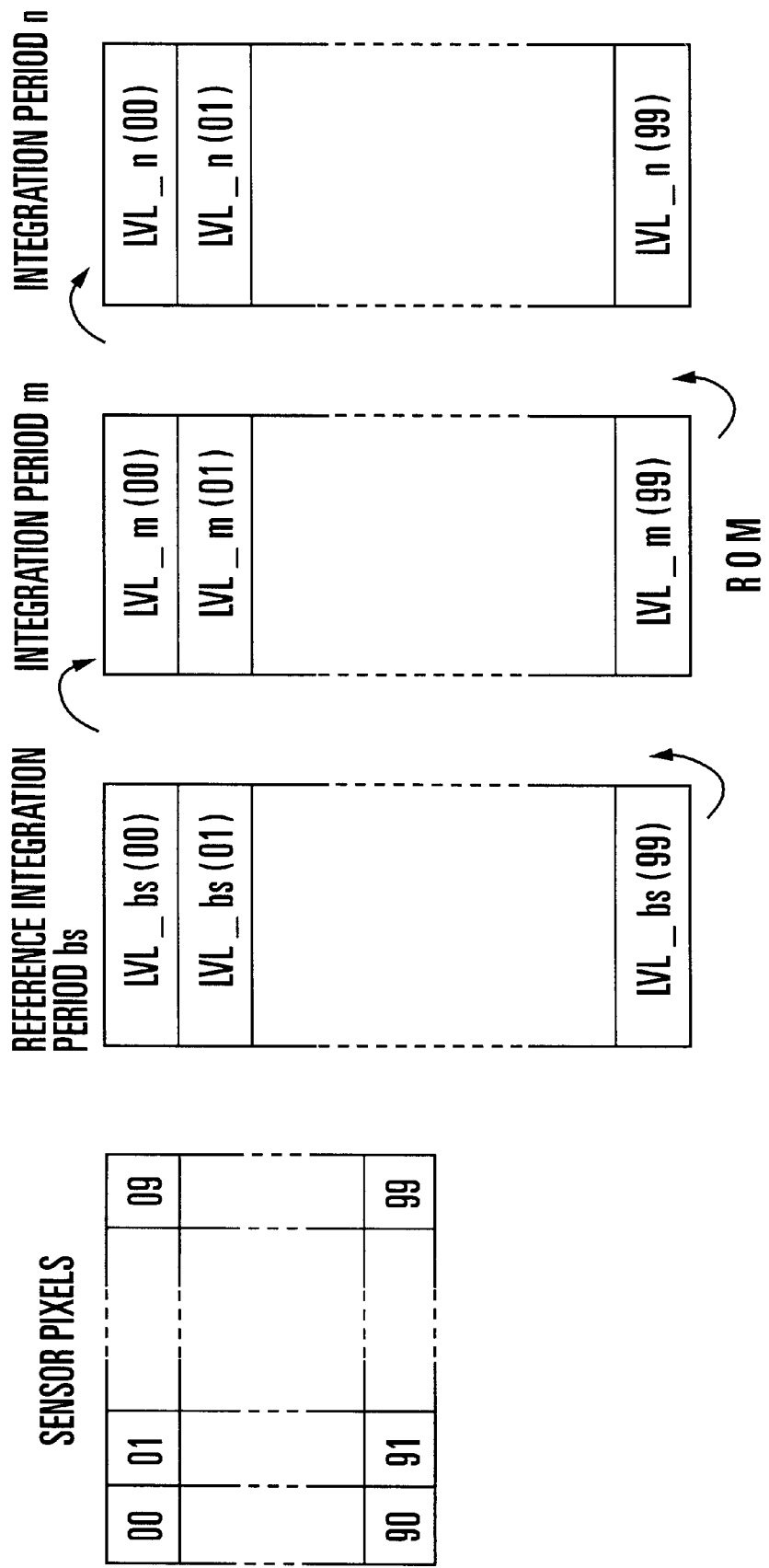
FIG. 14 shows how level correction values are stored in a memory by the conventional device.

As mentioned in the foregoing description of gain correction, if the pixels are formed on one and the same lot with one and the same circuit, the output change characteristic of each pixel does not much vary from that of another. A change in output of one pixel due to a difference in integration period thus can be considered about the same as those of others. Therefore, as shown in FIG. 2, a value obtained by multiplying the average value of output change characteristics of the pixels by the amounts of change of light quantity for different integration periods can be used in common for level correction for all pixels, as level shift amounts ΔLVL(bs,m)ave and ΔLVL(bs,n)ave. As for an adjustment-value storing memory, level correction can be adequately made for each of different integration periods by storing only one correction data, i.e., an average level shift amount. This is a great advantage over the conventional arrangement which has been as shown in FIG. 14.

The details of the first embodiment of the invention are as follows. In the case of the first embodiment, the invention is applied to a single-lens reflex camera which is provided with a light measuring sensor composed of 10×10 pixels and is arranged to be capable of making level correction for different integration periods which differ from a reference integration period by carrying out a level shift correction, in common for all pixels, from a level obtained by the reference integration period.

Figure 3:
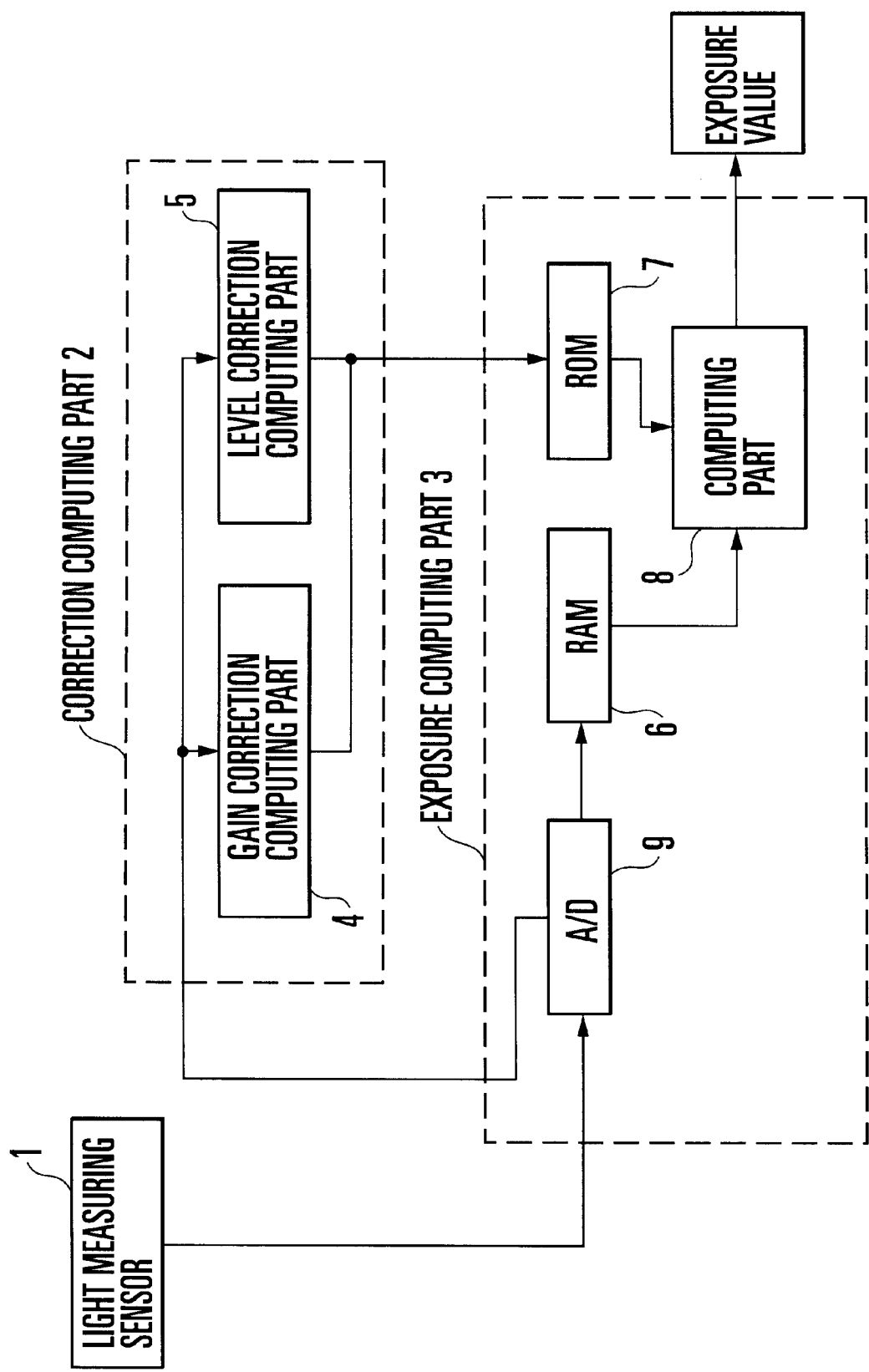
FIG. 3 is a block diagram showing the circuit arrangement of essential parts of a single-lens reflex camera which is provided with the exposure computing device according to the first embodiment of the invention.

FIG. 3 is a block diagram showing the whole electrical arrangement for an exposure computing device, etc., mounted on the single-lens reflex camera.

Referring to FIG. 3, a light measuring sensor 1 has a plurality of pixels. The light measuring sensor 1 is arranged to measure light passing through a photo-taking lens for each of the pixels and to output the light measurement value as the output value of the pixel. The output of the light measuring sensor 1 is A/D-converted by an A/D converter 9 disposed within an exposure computing part 3. Data thus obtained is supplied to a correction computing part 2 and a RAM 6 disposed within the exposure computing part 3. The correction computing part 2 includes a gain correction computing part 4 and a level correction computing part 5. The gain correction computing part 4 is arranged to compute and obtain gain correction values from the A/D-converted sensor output for two different values of luminance. The level correction computing part 5 is arranged to compute and obtain a level correction value from the A/D-converted sensor output for one value of luminance. The correction values computed by the gain correction computing part 4 and the level correction computing part 5 are stored in a ROM 7 disposed within the exposure computing part 3. Since it might become necessary to vary the correction values stored (written) in the ROM 7 again after a check is made for an exposure value, an EEPROM or the like which permits rewriting is employed as the ROM 7. The correction computing part 2 is a tool (a PC or the like) arranged independently of the camera to be capable of communicating with the camera. The correction computing part 2 reads a sensor output from the A/D converter 9 of the exposure computing part 3 of the camera and writes the computed correction values into the ROM 7 which is disposed within the exposure computing part 3.

The exposure computing part 3 includes the A/D converter 9 arranged to convert the analog output of the light measuring sensor 1 into a digital signal, the ROM 7 arranged to store the correction value computed by the correction computing part 2, the RAM 6 arranged to temporarily store the A/D-converted sensor output, and a computing part 8 arranged to compute and obtain an exposure value from the data stored in the ROM 7 and the RAM 6. More specifically, the computing part 8 computes an exposure value for each of the pixels by carrying out a computing operation on the sensor output stored in the RAM 6 using the gain and level correction values which are stored in the ROM 7. After that, an exposure value for a whole image plane is obtained through a computing operation finally performed by adding information on the position of the object of shooting, film exposure, etc. However, the details thereof are omitted from the description as being not directly related to the invention.

Next, an operation of the first embodiment performed by the correction computing part 2 which obtains the output values of the light measuring sensor 1 and computes correction values for the sensor outputs connected to the single-lens reflex camera which is provided with the light measuring sensor 1 and the exposure computing part 3 is described as follows.

Figure 4A:
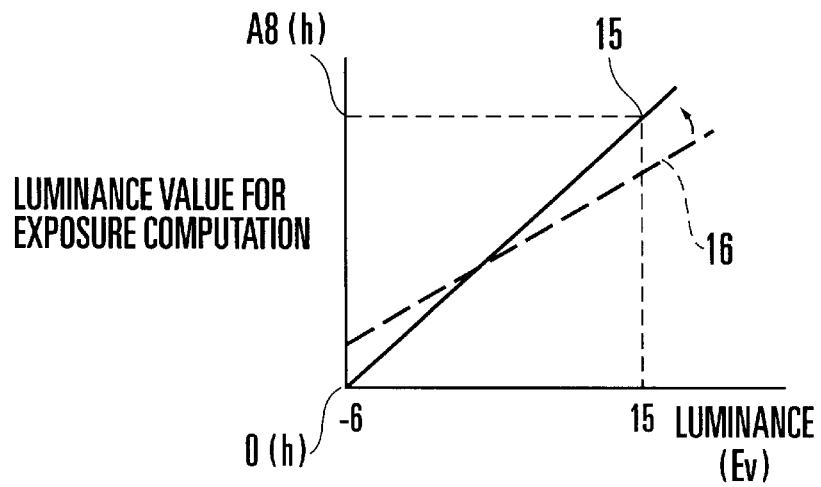
FIGS. 4(a), 4(b) and 4(c) show how the first embodiment performs gain correction and level correction.
Figure 4B:
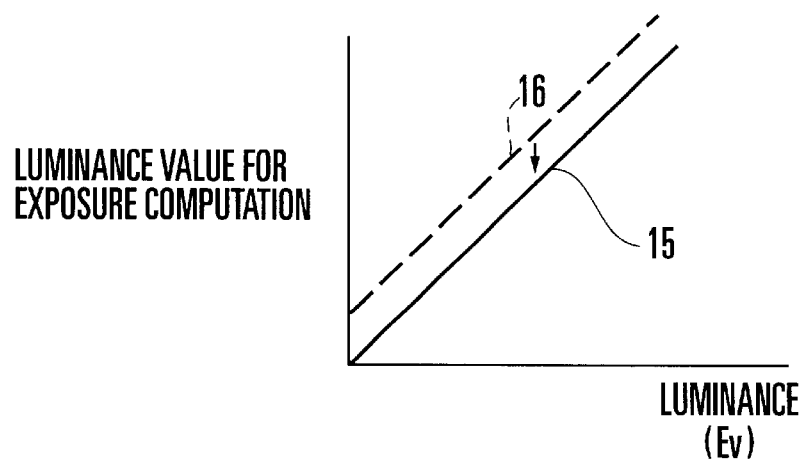
Figure 4C:
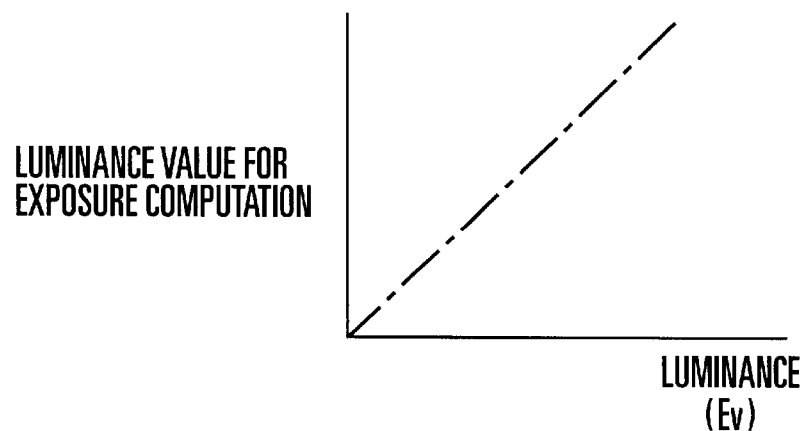

Referring to FIGS. 4(a), 4(b) and 4(c), the basic concept of level and gain correcting actions on the light measuring sensor 1 is first briefly described.

A term "sensor correction" used for the purpose of the invention basically means to convert an output characteristic 16 of the sensor into the intrinsic exposure characteristic 15 of the camera. FIG. 4(a) shows an initial state of the camera. In this state, the intrinsic exposure characteristic 15 shows an exposure value characteristic of the camera for the luminance of field. The intrinsic exposure characteristic 15 of the camera is assumed to have an output A8(h) at a luminance value Ev 15 and an output 0(h) at a luminance value Ev–6. The gain of the output characteristic 16 of the light measuring sensor is first corrected to obtain a characteristic as shown in FIG. 4(b). Next, the level correction is made to change the characteristic 16 of FIG. 4(b) into a characteristic which is equal to the intrinsic exposure characteristic 15 of the camera, as shown in FIG. 4(c). The output characteristic 16 of the light measuring sensor thus can be converted into the intrinsic characteristic 15 of the camera.

Method for computing gain and level correction values, a method for computing a level shift amount when the integration period is changed, a method for storing the computed correction values in the memory and a method for verifying the correction values are next described below with reference to formulas (1) to (9) shown in FIGS. 5 to 7 and also to FIGS. 8 and 9.

Formula (1) shown in FIG. 5 is a basic formula for converting the output characteristic 16 of the light measuring sensor into the intrinsic exposure characteristic 15 of the camera. In the formula (1), GAIN and LEVEL represent the gain and level correction values, respectively. T represents a correction value for temperature, and AEBase represents a value at which the sensor output remains unchanged irrespective of changes in temperature. The values T and AEBase are inherent values of the sensor for temperature. The further details of the values T and AEBase are omitted from the description as being not important for the gist of the invention.

The gain correction value can be obtained by substituting the output values of the sensor for two specific luminance values into the formula (1) and by eliminating the value LEVEL from two formulas having the sensor output values respectively substituted therein. In this case, a formula having a luminance value "a" substituted therein is used as a formula (2) and another formula having a luminance value "b" substituted therein is used as a formula (3). The value LEVEL is eliminated from these formulas (2) and (3) to obtain a formula (4) which is a gain correction formula. It is to be noted that, in each of these formulas, AD(a) and AD(b) respectively represent uncorrected output values of the sensor, and Exp(a) and Exp(b) respectively represent the intrinsic exposure values of the camera for the luminance values "a" and "b".

The level correction value can be obtained from a formula (5) shown in FIG. 6. The formula (5) is obtained by substituting an output value of the sensor for a specific luminance value into the formula (1). Referring to FIG. 6, the sensor output value AD(b) is substituted for the luminance value "b". In the formula (5), Exp(b) represents the intrinsic exposure value of the camera for the luminance value "b", as in the case of the formula (4).

Next, the level shift amounts to be obtained in a case where the integration period changes is described.

In FIG. 7, a formula (6) is a basic formula for obtaining a level shift amount. A level shift amount $\Delta LVL(bs,m)$ is obtained by multiplying an amount of change of light quantity $\Delta T\_EV(bs,m)$ caused by a change of integration period by an output change characteristic $\Delta AE$ indicating an output change per Ev, as shown in the formula (6). An actual level shift amount computing formula (9) is obtained by substituting formulas (7) and (8) into the formula (6).

Processes for gain correction, level correction and verifying an actual exposure value are next described below with reference to FIG. 8 which is a flow chart.

Figure 8:
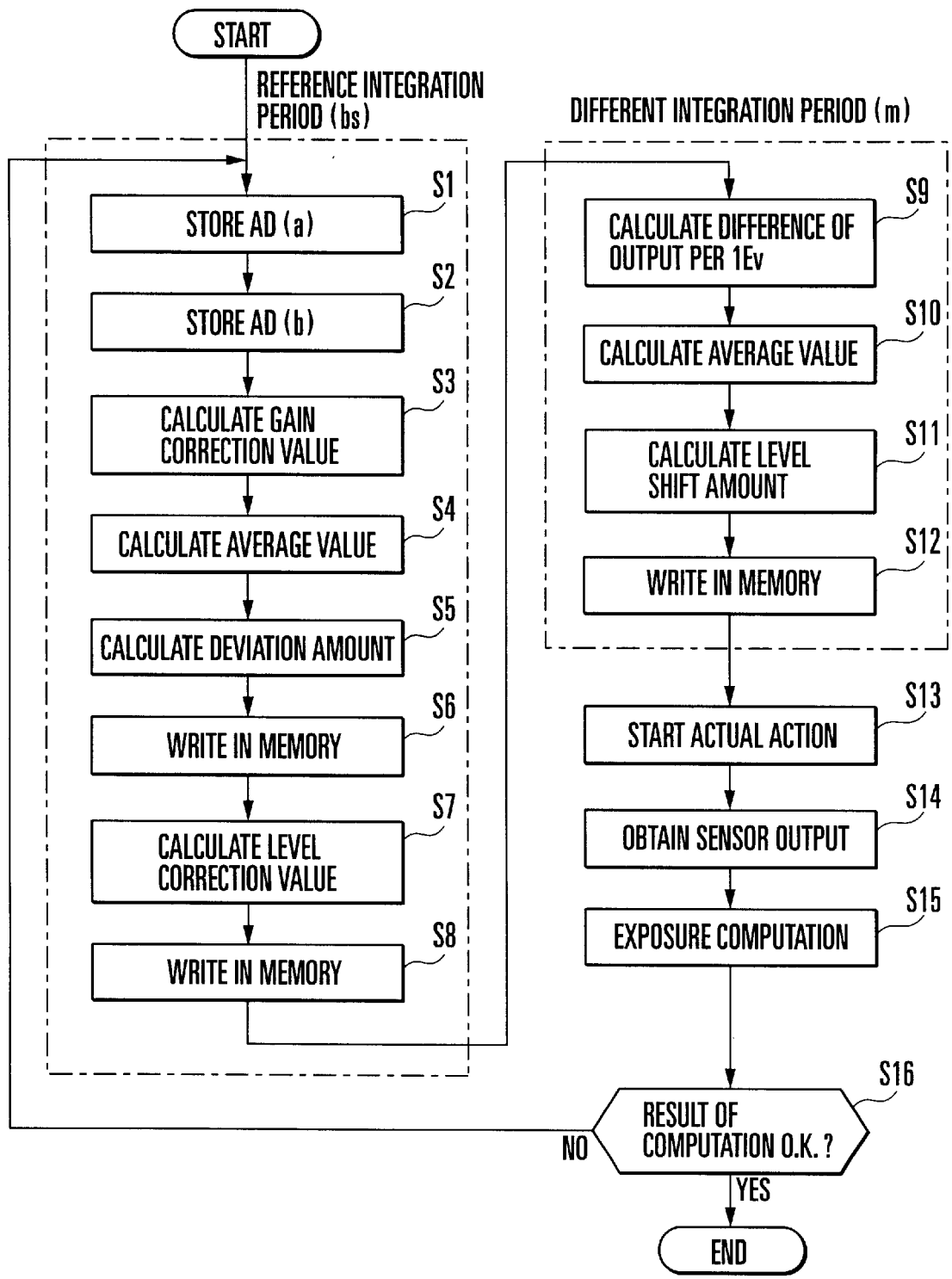
FIG. 8 is a flow chart showing actions to be performed by essential parts of the exposure computing device according to the first embodiment of the invention.

Referring to FIG. 8, at steps S1 and S2, the output values AD(a) and AD(b) of the light measuring sensor 1 for the specific luminance values "a" and "b" are stored for computing a gain correction value. At a step S3, a gain correction value is computed in accordance with the formula (4) shown above for every pixel. At the next step S4, an average value of gain correction values for all pixels is computed. At a step S5, a deviation amount of the gain correction value from the average value is computed for every pixel. At a step S6, the computed gain-correction deviation amounts for all pixels and the average value of gain correction are stored in the memory, i.e., the ROM 7, in a state as shown in FIG. 1.

With the light measuring sensor being of the kind arranged to logarithmically compress an electrical signal coming from a light receiving part and to output the signal in the logarithmically compressed state, the gain of each pixel does not much vary from that of another because of its characteristic. Therefore, as shown in FIG. 1, the deviation amount of correction from the average value for one pixel can be stored with a storage capacity about one half of the storage capacity required by the conventional arrangement.

At the next step S7, a level correction value is computed for each pixel in accordance with the formula (5) by using the gain correction value computed and the output value AD(b) of the light measuring sensor 1 obtained for the luminance value "b". At a step S8, the level correction value of each pixel for the reference integration period is stored in the memory (ROM 7) as shown in FIG. 2.

The level shift correction for different integration periods is made as follows. At a step S9, the output change characteristic of each pixel is computed in accordance with the formula (8) by using the sensor output values (light measurement values) AD(a) and AD(b) for luminance values "a" and "b" obtained in computing the gain correction values. At a step S10, the average of the output change characteristic values obtained at the step S9 is computed. At a step S11, an average level shift amount for all pixels is computed in accordance with the formula (9). At a step S12, the result of the operation of the step S11 is stored in the memory as a common level shift amount for all pixels, as shown in FIG. 2.

With three correction values, i.e., the gain correction values, level correction values and level shift correction values, thus written into the memory, the flow of operation proceeds from the step S12 to a step S13 to perform actual camera actions. At a step S14, an output of the light measuring sensor 1 is obtained. At a step S15, exposure values are obtained by carrying out a computing operation according to the sensor output and the above-stated correction values. At a step S16, a check is made to find if the exposure values obtained after correction for all pixels are uniform and specific values for a field varying its luminance with uniform luminance distribution, for example, to find if the exposure computing luminance values are at A8(h) for the luminance Ev 15 in the case of the exposure characteristic 15 as shown in FIG. 4(a). If so, the exposure values are employed. In the event of such troubles that the values after correction are found to be varying and uneven among pixels or not corresponding to changes of luminance, the flow returns to the step S1 to repeat the steps of computing the gain correction values, etc.

The methods for computing the gain correction values, the level correction values, and the level shift amounts during changes of the integration period, and the processes for storing the correction values in the memory and for verifying the correction values are as described above.

FIG. 9 shows the state of all correction values written into the ROM for the integration periods "bs" and "m", and computation formulas for obtaining level correction values and gain correction values for exposure computation from the values stored.

For the reference integration period bs, level correction values (LVL_bs(i)) are stored for the 100 m pixels. As regards level correction for the different integration period m, only an average shift amount ΔLVL(bs,m)ave resulting from the change of integration period is stored as a correction parameter for all pixels. For correcting the level of each individual pixel, the shift amount ΔLVL(bs,m)ave is added to the amount of level correction LVL_bs(i) for the reference integration period of each pixel by the exposure computing part 8 shown in FIG. 3.

In respect of gain correction, for the reference integration period, an average value GAIN_AVE of the gain correction values for all pixels and a deviation amount ΔGAIN(i) of each pixel from the average value are stored as correction parameters. For the different integration periods, the same adjustment parameters are stored in consideration of the characteristic of the logarithmical-compression-type light measuring sensor mentioned above.

Figure 10:
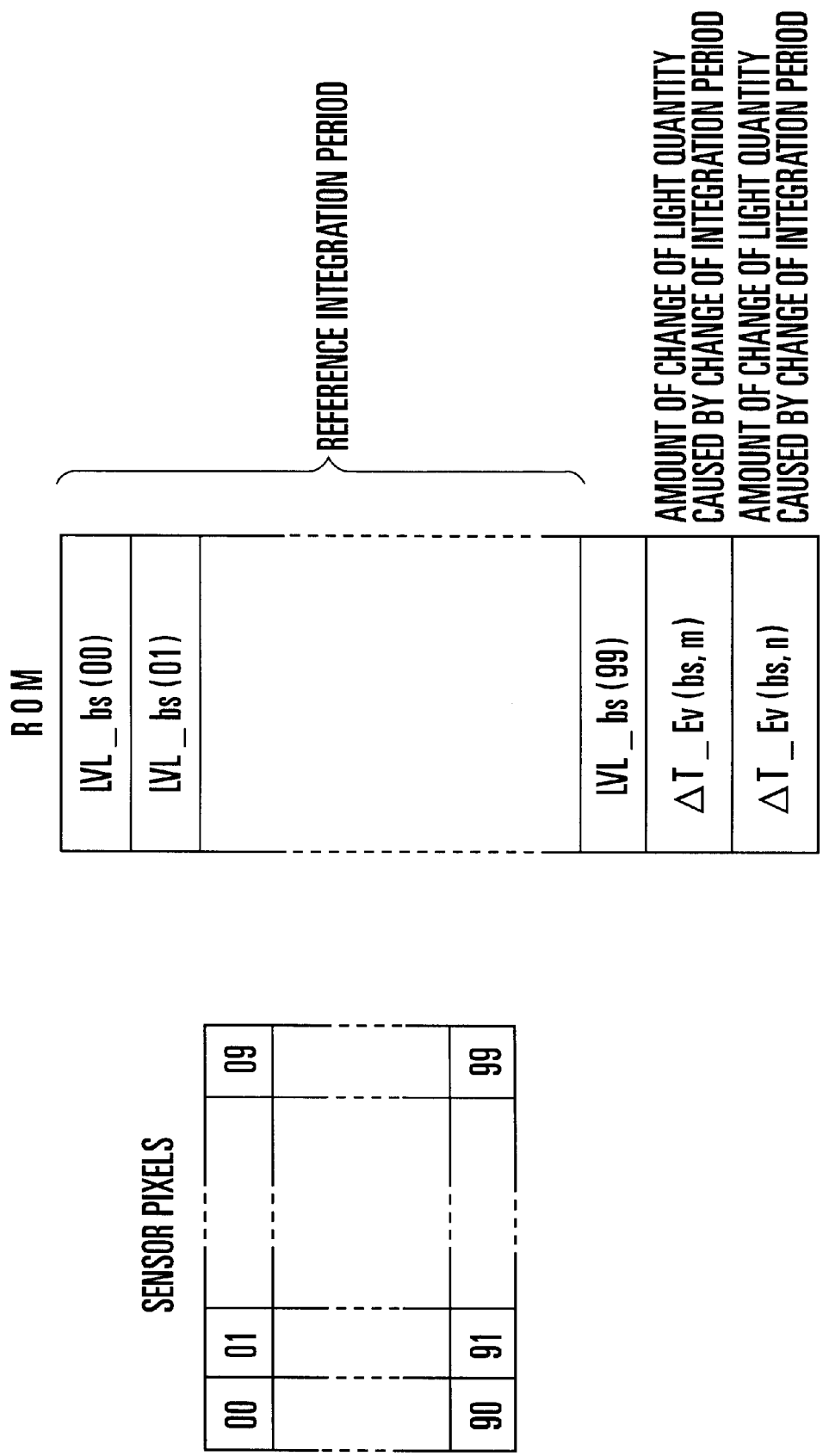
FIG. 10 shows how level correction values are stored in the memory of the exposure computing device in the second embodiment of the invention.
Figure 11:
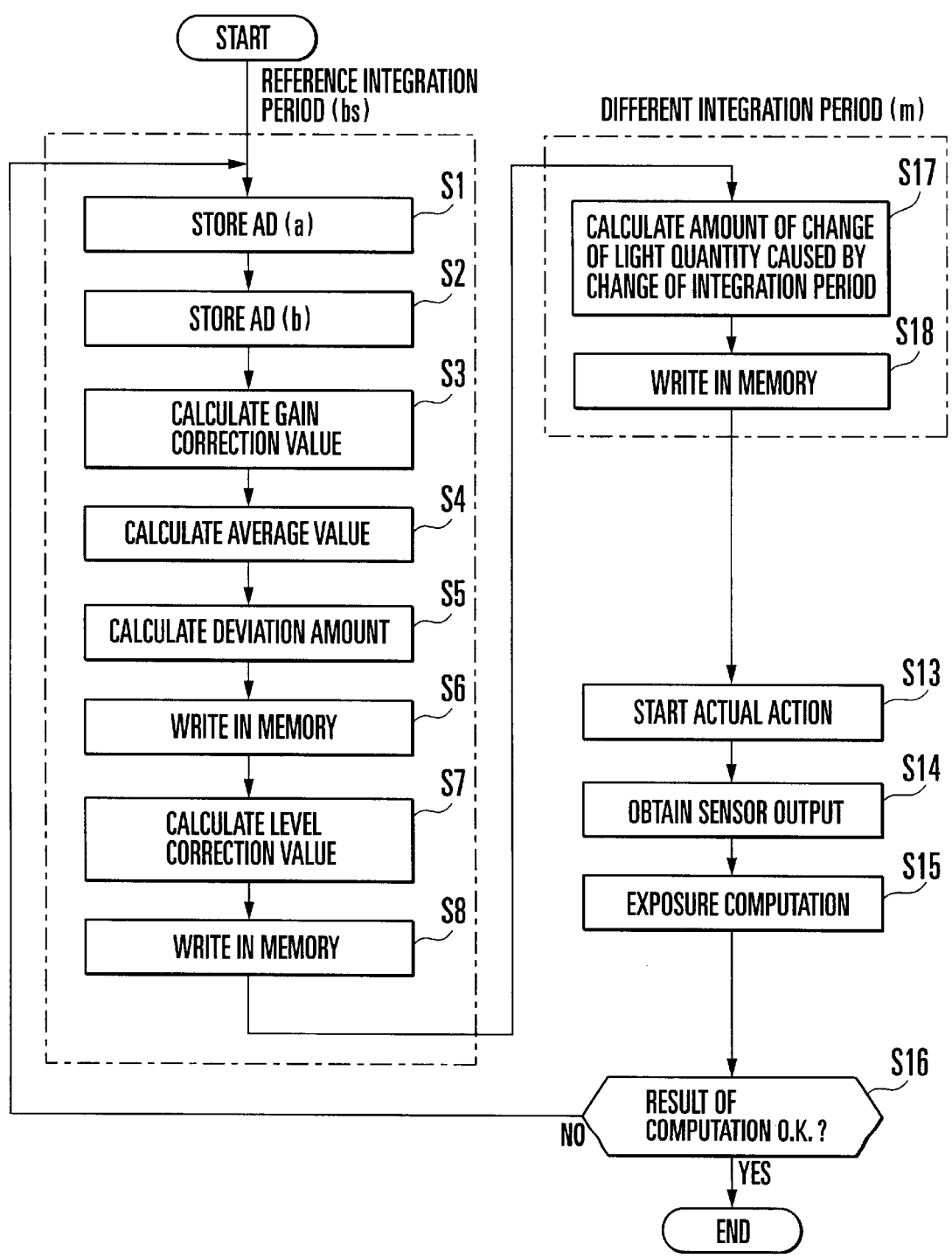
FIG. 11 is a flow chart showing actions to be performed by essential parts of the exposure computing device according to the second embodiment of the invention.

FIGS. 10, 11 and 12 show, as a second embodiment of the invention, a case where level correction is made for each individual pixel in making level correction for different integration periods.

In making level correction for different integration periods, the reliability of correction can be enhanced by obtaining a level shift amount for each individual pixel from the output change characteristic of each pixel and by making level shift correction for each pixel following variations in integration period. In this case, as shown in FIG. 10, the output change characteristic of each pixel can be computed and obtained from the gain correction value of each pixel. Therefore, gain correction values can be computed by storing, in the memory (ROM), the amounts of change of light quantity caused by a change of integration period. In other words, in a case where outputs of the light measuring sensor are to be corrected by first computing gain correction values, the level shift of each pixel can be accurately corrected without storing any new data for this purpose according to the arrangement of the second embodiment.

The following describes only such points where the second embodiment differs from the first embodiment.

In expressing a level shift amount by using a value of gain, the formula (10) of FIG. 7 can be obtained by using the gain correction formula (4) of FIG. 5 for the formula (8) of FIG. 7. Then, a formula (11) for computing a level shift amount using a gain correction value can be obtained by integrating the formula (10) with respect to the formula (7).

Further, as for the memory for storing the correction values, an amount of change of light quantity $\Delta T\_Ev(bs,m)$ caused by a change of integration period, obtained by the formula (7), is stored as shown in FIG. 10. This correction value can be written into the memory at a point of time when an integration period is decided, as shown also at steps S17 and S18 in FIG. 11 which is a flow chart.

With the steps S17 and S18 executed, an item reading as "the level shift amount" in a table of FIG. 9 relative to the first embodiment is replaced with an item reading "the amount of change of light quantity caused by a change of integration period" in a table of FIG. 12. The value of this item is employed as a correction parameter. As for correction values to be stored in the memory, as mentioned above, values computed in accordance with the formula (7) are stored in the memory as correction values. The level correction value for an integration period m is computed by the following formula:

$$LVL\_bs(i)+\Delta T\_Ev(bs,m)\times(\text{Exp }(b)-\exp(a))\times T/(b-a)\cdot \text{GAIN }(i)$$

This computing operation which is rather complex is carried out by the computing part 8 shown in FIG. 3.

The storage capacity of the memory required for the level correction in the second embodiment is similar to that of the memory in the first embodiment. Although the values to be stored in the memory can be simply computed, the correction can be reliably accomplished. Only, the computing operation is rather complex as shown above. Therefore, in a case where the number of pixels of the sensor is increased, the length of time necessary for an exposure computing operation becomes long.

What is claimed is:

1. A light measuring device comprising:
   a) an integration-type light measuring sensor having a plurality of pixels and arranged to logarithmically compress a signal of light received by each pixel and to output the signal as a light measurement value for each pixel;

b) a memory arranged to store an average of gain correction values for all pixels of said light measuring sensor, a deviation from the average of gain correction values obtained for each pixel of said light measuring sensor, a level correction value for each pixel of said light measuring sensor obtained for a reference integration period, and an average of level shift amounts of all pixels of said light measuring sensor caused by a change of integration period; and c) a computing circuit arranged to compute, from the level correction value for each pixel and the average of level shift amounts of all pixels stored in said memory, a level correction value for each pixel of said light measuring sensor for an integration period other than the reference integration period.

2. A light measuring device according to claim 1, wherein the pixels of said light measuring sensor is formed by one and the same circuit on one and the same lot.

3. A light measuring device according to claim 1, wherein the average of level shift amounts of all pixels of said light measuring sensor is a value obtained by multiplying an average value of output change characteristics of the pixels by an amount of change of integral light quantity caused by a change of integration period.

4. A light measuring device according to claim 1, wherein said memory is a rewritable nonvolatile memory.

5. A light measuring device comprising:

a) an integration-type light measuring sensor having a plurality of pixels and arranged to logarithmically compress a signal of light received by each pixel and to output the signal as a light measurement value for each pixel;

b) a memory arranged to store an average of gain correction values for all pixels of said light measuring sensor, a deviation from the average of gain correction values obtained for each pixel of said light measuring sensor, a level correction value for each pixel of said light measuring sensor obtained for a reference integration period, and an amount of change of light quantity caused by a change of integration period; and c) a computing circuit arranged to compute, from the level correction value for each pixel and the amount of change of light quantity caused by a change of integration period stored in said memory, a level correction value for each pixel of said light measuring sensor for an integration period other than the reference integration period.

6. A light measuring device according to claim 5, wherein said computing circuit computes a level shift amount for each pixel of said light measuring sensor from the amount of change of light quantity caused by a change of integration period, and, after that, computes a level correction value for each pixel of said light measuring sensor by utilizing the level shift amount for each pixel.

7. A light measuring device according to claim 5, wherein said memory is a rewritable nonvolatile memory.

8. A camera comprising:

a) an integration-type light measuring sensor having a plurality of pixels and arranged to logarithmically compress a signal of light received by each pixel and to output the signal as a light measurement value for each pixel;

b) a memory arranged to store an average of gain correction values for all pixels of said light measuring sensor, a deviation from the average of gain correction values obtained for each pixel of said light measuring sensor, a level correction value for each pixel of said light measuring sensor obtained for a reference integration period, and an average of level shift amounts of all pixels of said light measuring sensor caused by a change of integration period; and c) a computing circuit arranged to compute, from the level correction value for each pixel and the average of level shift amounts of all pixels stored in said memory, a level correction value for each pixel of said light measuring sensor for an integration period other than the reference integration period.

9. A camera according to claim 8, wherein the pixels of said light measuring sensor is formed by one and the same circuit on one and the same lot.

10. A camera according to claim 8, wherein the average of level shift amounts of all pixels of said light measuring sensor is a value obtained by multiplying an average value of output change characteristics of the pixels by an amount of change of integral light quantity caused by a change of integration period.

11. A camera according to claim 8, wherein said memory is a rewritable nonvolatile memory.

12. A camera comprising:

a) an integration-type light measuring sensor having a plurality of pixels and arranged to logarithmically compress a signal of light received by each pixel and to output the signal as a light measurement value for each pixel;

b) a memory arranged to store an average of gain correction values for all pixels of said light measuring sensor, a deviation from the average of gain correction values obtained for each pixel of said light measuring sensor, a level correction value for each pixel of said light measuring sensor obtained for a reference integration period, and an amount of change of light quantity caused by a change of integration period; and c) a computing circuit arranged to compute, from the level correction value for each pixel and the amount of change of light quantity caused by a change of integration period stored in said memory, a level correction value for each pixel of said light measuring sensor for an integration period other than the reference integration period.

13. A camera according to claim 12, wherein said computing circuit computes a level shift amount for each pixel of said light measuring sensor from the amount of change of light quantity caused by a change of integration period, and, after that, computes a level correction value for each pixel of said light measuring sensor by utilizing the level shift amount for each pixel.

14. A camera according to claim 12, wherein said memory is a rewritable nonvolatile memory.

* * * * *